United States Patent [19]

Brown

[11] 4,207,979
[45] Jun. 17, 1980

[54] TRAY FOR SORTING AND STORING PHOTOGRAPHIC TRANSPARENCY SLIDES

[75] Inventor: Donald J. Brown, Naperville, Ill.

[73] Assignee: Knox Manufacturing Co., Wood Dale, Ill.

[21] Appl. No.: 944,772

[22] Filed: Sep. 21, 1978

[51] Int. Cl.² .................. B65D 21/02; B65D 85/62; B65D 1/36
[52] U.S. Cl. .................. 206/456; 206/518; 206/564; 206/804
[58] Field of Search .............. 206/456, 455, 387, 804, 206/564, 369, 518, 515

[56] References Cited

U.S. PATENT DOCUMENTS

| 935,420 | 9/1909 | Smith | 206/369 |
| 3,743,081 | 7/1973 | Roberg et al. | 206/387 |

FOREIGN PATENT DOCUMENTS 286952 12/1966 Australia .................. 206/456

Primary Examiner—William T. Dixson, Jr.
Attorney, Agent, or Firm—Wegner, Stellman, McCord, Wiles & Wood

[57] ABSTRACT

An overlay tray for holding a plurality of photographic slides in side-by-side relationship is integrally formed from transparent plastic and defines a series of parallel, longitudinal channels. Each channel has a longitudinal groove adjacent one channel wall so that pressure applied to the edge of the slide above the groove pivots the opposite edge of the slide outward from the channel. The walls of the overlay tray are constructed so that the trays may be stacked one upon the other in interfitting relationship with the bottom of one tray retaining the slides in fixed position within the tray below. A flange extends from one end of the overlay tray so that an identifying label placed thereon can be read through a stack of such trays.

8 Claims, 4 Drawing Figures

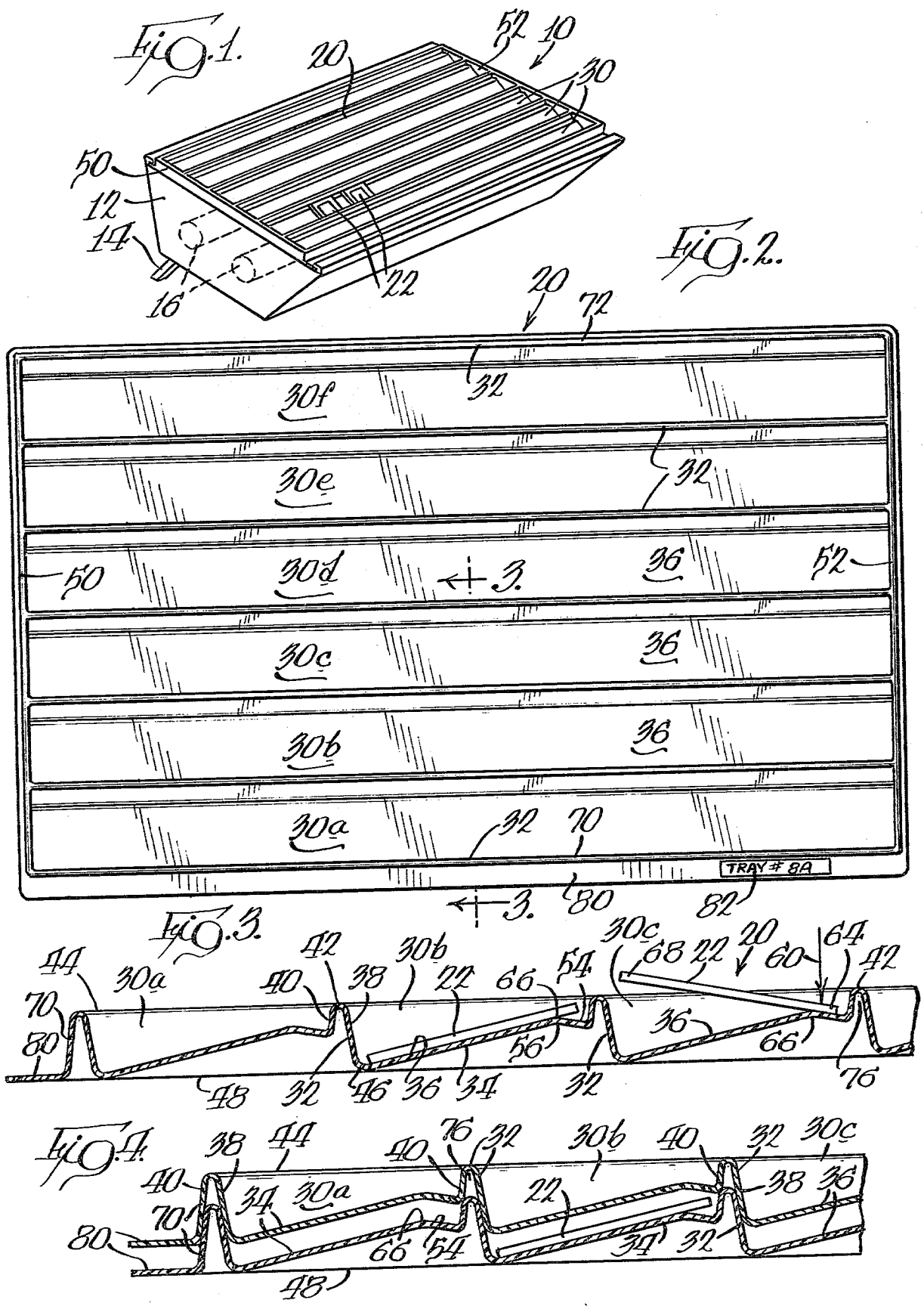

TRAY FOR SORTING AND STORING PHOTOGRAPHIC TRANSPARENCY SLIDES

BACKGROUND OF THE INVENTION

This invention relates generally to an overlay tray for sorting and storing transparency slides and, more particularly, to such a tray adapted to be stacked on a similar tray and adapted to permit a slide to be tilted out of its normal position.

Illuminated transparency viewers, or light boxes, commonly have a light source for providing a strong uniform light on a translucent surface to enable negatives, transparencies, slides, and the like, to be conveniently examined. Typically, such viewers are employed for editing or sorting and sequencing of such transparencies and slides. For example, the user may pick out and remove slides that are deficient in coloring or he may select slides relating to a single subject and arrange those slides in desired order for use with a projector. A preferred form of such a transparency viewer is shown in my copending applications, Ser. Nos. 868,982, 868,983, 868,984 and 868,985, all filed Jan. 12, 1978.

In the prior art, overlay devices or trays have been designed to overlie the translucent viewing surface of the illuminated viewer and provide support for slides. Some overlays have been formed from a sheet of transparent or translucent material having a sawtooth cross section, so as to provide a series of shelves or ledges with the edges of the slides selectively placed in side-by-side relationship in longitudinal rows. One problem encountered with such prior overlay trays is that they contain no provision for storing or transporting slides while they are retained in the tray. Thus, it is likely that the slides may be inadvertently dislodged from their selected locations, if the trays are moved or accidentally bumped.

SUMMARY OF THE INVENTION

It is a principal object of the present invention to provide a slide holder, or overlay tray, which is inexpensive and yet performs sorting and storing functions well. The simple overlay tray is adapted for facile retrieval of slides and for retaining the slides in selected position during storage and transporting of the tray.

In accordance with the invention, a transparency overlay tray is integrally constructed to define a series of parallel, longitudinal slide-receiving channels separated by respective upright wall members and terminated at the longitudinal ends by side wall members. When the overlay tray is placed on the translucent surface of an illuminated viewer, the bottom of each of the channels will support the slides in a selected position relative to the translucent surface and will have a longitudinal groove defined at one edge thereof so that one edge of a slide may be urged into the groove to bias the opposite edge upwardly from the channel so that it may be manually grasped.

The longitudinal walls separating the slide-receiving channels are constructed so that one surface defining the side wall of one channel is spaced from the other surface defining the side wall of the adjacent channel and is suitably slanted so that trays may be stacked one upon the other in interfitting relationship. When interfitted, the bottom of one tray is in close relationship with the top of the other tray so that the top tray is operative to retain the slides in position within the channels of the bottom tray.

A further feature of the tray is a transparent flange which extends from at least one edge of the tray so that a label placed thereon can be read through a stack of trays to permit ready identification of a particular tray.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a perspective view of a transparency viewer having an overlay tray of the present invention positioned thereon;

FIG. 2 is a top plan elevational view of the overlay tray;

FIG. 3 is an enlarged, fragmentary cross-sectional view of the overlay tray taken along line 3—3 of FIG. 2 and showing a pair of slides placed therein; and, FIG. 4 is an enlarged, fragmentary view of a pair of overlay trays in stacked relationship.

DESCRIPTION OF THE PREFERRED EMBODIMENT

In FIG. 1, a transparency viewer, generally designated 10, has a metal housing 12 supported in inclined position by spaced legs, one of which is shown and designated 14, illuminating means, such as fluorescent tubes 16, within the housing 10 to provide a conventional light source, and an overlay tray 20, which is positioned on a rectangular flat sheet of translucent material through which light from the fluorescent tubes 16 is transmitted.

The rectangular overlay tray 20 is preferably constructed by a suitable vacuum forming process from a single sheet of transparent plastic, such as transparent polyvinyl chloride, so that light transmitted through the translucent sheet passes through the overlay tray 20 to illuminate transparency slides 22.

Referring now to FIGS. 2 through 4, the construction of the overlay tray 20 will be described in detail. It is understood that while references to specific orientations and directions are used to facilitate description of the overlay tray herein, they are not to be construed as limitations of the invention.

The overlay tray 20 is made up of a series of parallel, similarly constructed depressions, or channels 30, extending laterally thereacross, which are adapted to receive slides in side-by-side relation and are designated individually herein as 30a, 30b, etc.

Each of the channels 30 is defined, at least in part, by spaced elongate walls 32 and a bottom or second wall 34. Adjacent channels are separated by the walls 32, which have an inverted, roughly V-shaped cross section and are spaced apart at a distance only slightly greater than the height of the slides 22. Each wall 32 has a wall portion 38 connected at an apex to a wall portion 40 to form said inverted V-shaped cross section. The slides, which typically are square and measure two inches by two inches, are thereby prevented from moving any great amount forwardly or rearwardly because of the abutting surfaces provided by the walls 32.

The bottom wall 34 provides a slightly slanted supporting surface 36 against which the slides 22 lie. The bottom wall 34 tilts forwardly and downwardly and has forward and rearward ends that are connected to the lower ends of the respective opposed wall portions 38 and 40 of adjacent walls 32. The lowermost edge of bottom wall 34 merges with the lower end of long wall portion 38 of one wall 32 and the uppermost edge merges with the lower edge of short wall portion 40 of an adjacent wall 32. As seen in FIG. 3, the apexes 42 of the walls 32 lie in a common plane 44 which broadly define the upper extremity of the entire overlay tray 20, while the arcuate corners 46, defined between the bottom walls 34 and the long wall portions 38, lie in a common plane 48 which broadly define the lower extremity of the overlay tray.

The channels 30 are closed at each lateral end by abutments, such as common walls 50 and 52, which also have an inverted, generally V-shaped cross section. Thus, the overlay tray has a continuous rectangular border defined by the lateral walls 50 and 52, the rearward wall portion 38 of the channel 30f and the forward wall portion 40 of the channel 30a. The overlay tray is constructed so that the width of the channels measured between the lateral walls 50 and 52 is equal to the width of an integral number of slides placed in edge-to-edge contact plus approximately ⅛ or 3/16 inch. Thus, when each channel 30a, 30b, etc., is full of slides, very little relative movement is permitted laterally between adjacent slides.

Such compact placement of slides normally would not readily permit the slides to be manually removed by a user, since the grasping thereof would be difficult in view of the depth of the channels and the limited amount of space maintained between slides or between a slide and the surrounding walls. To permit facile removal, each of the bottom walls 34 is configured to define, with respect to the plane of the supporting surface 36, a longitudinal depression, or groove 54, adjacent the wall portion 40. While the groove 54 may take numerous forms and may even be arcuate, the groove shown herein is defined by a relatively flat portion 56 angled with respect to the bottom wall 34. The portion 56 is transversely slanted relative to the upper plane 44 of the overlay tray 20 and has an orientation opposite that of the major supporting surface 36 of the bottom wall 34.

By manually applying a slight amount of pressure, as indicated by arrow 60, to the top edge 64 of the slide 22, the top edge of the slide moves into the groove 54, pivots the slide 22 about the arcuate corner 66 between the flat portion 56 and surface 36, and raises the bottom edge 68 of the slide off the surface 36 and out of the channel 30 to a point spaced above the upper edge of the tray. The bottom edge 68 of the slide 22 can then be easily grasped. It is noted that the slide edge need not be fully moved above the top plane 44 of the tray, since the sides of the slide may be grasped when the slide lies completely within the channel so long as the edge is raised above the plane defined by adjacent slides.

Since the lateral walls 50 and 52, the end wall 70, which is an extension of one wall portion 40, and end wall 72, which is an extension of one wall portion 38, and the remaining wall portions 38,40 forming walls 32 separating the channels 30 are all V-shaped, nesting of two or more trays in stacked relation is permitted, as seen in FIG. 4. For example, the wall portions 38 and 40 define a space or groove therebetween, designated 76, into which the wall portions 38 and 40 of a lower overlay tray may be inserted. Each of the wall portions is suitably canted relative to the vertical to permit the trays to be moved into a closely stacked position to prevent upward movement of a slide and movement of one slide over an adjacently disposed slide as seen in FIG. 4. The grooved flat portion 56 will maintain the slide in position. However, it should be apparent that the trays should be constructed to permit close positioning therebetween, but constructed to prevent any contact that would bend the slides around the arcuate corner 66 and cause permanent damage thereto.

In this manner, any number of such trays 20 may be stored or transported by stacking the trays as shown in FIG. 4 and may be secured together by applying adhesive tape, or any other suitable securing means, to the edges. The top tray in such a stack, if it has slides, may be covered by an empty tray so that its slides are also protected from dislodgement.

The overlay tray 20 may also be constructed to define one or more flanges at the edges thereof. In FIGS. 2 through 4, one such flange is illustrated and designated 80 and depends from the lower edge of the forward end wall 70. The flange 80 of any particular tray may carry a label 82 to identify the tray number or the subject matter of the slides carried on that tray. Since the overlay trays 20 are transparent, if the labels are attached in a manner so as to be offset from labels on adjacent trays, easy identification of the subject matter on each of the trays is permitted by looking through the stacked flanges 80.

I claim:

1. An integrally formed overlay tray of light transmitting material for holding a plurality of photographic slides in side-by-side relationship and having base means lying in a common plane, said tray being formed with a series of spaced elongate first walls having upper and lower ends, the adjacent lower ends thereof each being joined together by an elongate second wall to define a series of longitudinal slide-receiving channels, each channel supporting a slide in a slightly upwardly inclined position in relation to said base means to afford substantially uniform illumination of each slide, said first walls being spaced apart a distance generally equal to the height of the slides, and each of said second walls defining a longitudinal groove adjacent one of said first walls so as to lie underneath an edge of a slide which may be reposing within the respective channel against the second wall, whereby pressure applied to the edge of the slide overlapping said groove moves the edge into the groove to pivot the slide and raise the opposite edge thereof from the bottom of the channel.

2. The overlay tray of claim 1 wherein the upper ends of said first walls lie in a common plane and each second wall extending from the groove is planar.

3. The overlay tray of claim 1 wherein each of said grooves is defined by a segment of said second wall slanted at an angle transverse to that of the remainder of the second wall.

4. The overlay tray of claim 1 wherein each of said first walls has a pair of wall portions joined together to provide an apex which is generally of inverted V-shape in cross section, the apexes of said first walls defining said upper wall ends and the opposite ends of said wall portions defining the lower wall ends to which adjacent second walls are joined.

5. An overlay tray for holding a plurality of photographic slides in side-by-side relationship formed with a series of spaced elongate first walls having upper and lower ends, the lower ends thereof being respectively joined together by a series of elongate second walls to define a series of longitudinal slide-receiving channels, said first walls being spaced apart a distance generally equal to the height of the slides, each first wall including a pair of wall portions joined together to provide a longitudinally extending apex on the upper side of the tray and a longitudinally extending recess on the under side of the tray, said apexes thereof defining the upper wall ends and the wall portions thereof separating adjacent channels, said wall portions being canted sufficiently to permit stacking of one or more trays together with the apex of each of said first walls of one tray being inserted into the recesses of the tray above and each of the second walls of the tray above nesting within the channel of the tray below, the spacing between the second walls of the tray being greater than the thickness of a slide and less than twice the thickness of a slide.

6. The overlay tray of claim 5 wherein said tray is formed of transparent plastic to permit the passage of light therethrough without substantial dispersal.

7. The overlay tray of claim 6 further including a flange extending from one edge of said tray and adapted to receive label means which may be visually identified by a user looking through a plurality of such flanges of trays stacked one upon the other.

8. An overlay tray for holding a plurality of photographic slides in side-by-side relationship formed with a series of spaced elongate first walls having upper and lower ends, the lower ends thereof being respectively joined together by a series of elongate second walls to define a series of longitudinal slide-receiving channels, said first walls being spaced apart a distance generally equal to the height of the slides, each of said second walls having a longitudinal groove adjacent one of said first walls so as to lie underneath an edge of a slide which may be reposing within the respective channel against the second wall and permit manually induced movement of the slide edge into the groove, each said first walls including a pair of wall portions joined together to provide a longitudinally extending apex on the upper side of the tray and a longitudinally extending recess on the under side of the tray, the apex of each first wall defining the upper wall end and the wall portions thereof separating adjacent channels, said wall portions being canted sufficiently to permit stacking of one or more trays together with the apex of each of said first walls of one tray being inserted into the recesses of the tray above and each of the second walls of the tray above nesting within the channel of the tray below, the spacing between the second walls of the tray being greater than the thickness of a slide and less than twice the thickness of a slide.

* * * * *